United States Patent
Mulik et al.

(10) Patent No.: US 12,516,187 B2
(45) Date of Patent: Jan. 6, 2026

(54) HIGH ACID ACRYLIC STYRENE ACRYLIC AND ACRYLIC EMULSION COPOLYMER MODIFIED UREA FORMALDEHYDE BINDERS FOR MINERAL FIBERS

(71) Applicant: Rohm and Haas Company, Collegeville, PA (US)

(72) Inventors: Sudhir M. Mulik, North Wales, PA (US); William C. Finch, Ambler, PA (US); C. Damien Rodowski, Downingtown, PA (US)

(73) Assignee: Rohm and Haas Company, Collegeville, PA (US)

( * ) Notice: Subject to any disclaimer, the term of this patent is extended or adjusted under 35 U.S.C. 154(b) by 351 days.

(21) Appl. No.: 17/923,000

(22) PCT Filed: Jul. 23, 2021

(86) PCT No.: PCT/US2021/042863
§ 371 (c)(1),
(2) Date: Nov. 3, 2022

(87) PCT Pub. No.: WO2022/035577
PCT Pub. Date: Feb. 17, 2022

(65) Prior Publication Data
US 2023/0174771 A1 Jun. 8, 2023

Related U.S. Application Data

(60) Provisional application No. 63/065,533, filed on Aug. 14, 2020.

(51) Int. Cl.
*C08L 61/24* (2006.01)
*D04H 1/4218* (2012.01)
*D04H 1/587* (2012.01)
*D04H 1/645* (2012.01)

(52) U.S. Cl.
CPC ............ *C08L 61/24* (2013.01); *D04H 1/4218* (2013.01); *D04H 1/587* (2013.01); *D04H 1/645* (2013.01); *D10B 2101/06* (2013.01)

(58) Field of Classification Search
None
See application file for complete search history.

(56) References Cited

U.S. PATENT DOCUMENTS

| | | | | |
|---|---|---|---|---|
| 3,919,154 A | * | 11/1975 | Chang | C09D 133/064 524/832 |
| 3,926,888 A | * | 12/1975 | Cheung | C09D 133/064 524/832 |
| 3,928,273 A | * | 12/1975 | Chang | C09D 133/064 526/318.4 |
| 4,062,823 A | * | 12/1977 | Cheung | C09D 133/064 524/376 |
| 4,258,098 A | | 3/1981 | Bondoc et al. | |
| 4,560,612 A | | 12/1985 | Yau | |
| 4,859,508 A | * | 8/1989 | Pangrazi | D04H 1/587 428/920 |
| 4,917,764 A | * | 4/1990 | Lalwani | D04H 1/4218 428/307.3 |
| 5,804,254 A | * | 9/1998 | Nedwick | D04H 1/587 427/389.8 |
| 5,914,365 A | * | 6/1999 | Chang | C08L 61/24 525/163 |
| 6,384,116 B1 | | 5/2002 | Chan et al. | |
| 6,642,299 B2 | * | 11/2003 | Wertz | D04H 1/587 525/163 |
| 6,770,169 B1 | * | 8/2004 | Wallace | D21H 13/40 525/518 |
| 8,053,528 B2 | * | 11/2011 | Shoemake | C08L 61/24 525/55 |
| 8,222,167 B2 | | 7/2012 | Shoemake et al. | |
| 8,445,564 B2 | | 5/2013 | Kelly | |
| 10,280,301 B2 | * | 5/2019 | Bohling | C08L 61/24 |
| 11,952,689 B2 | * | 4/2024 | Guo | C09J 101/286 |
| 2004/0219847 A1 | | 11/2004 | Miller | |

(Continued)

FOREIGN PATENT DOCUMENTS

| | | | |
|---|---|---|---|
| AU | 198666112 | 6/1987 | |
| CA | 2564094 A1 | 12/2005 | |
| CA | 2817571 A1 * | 12/2013 | ............... C08L 1/00 |
| CN | 104945843 A | 9/2015 | |
| CN | 106459716 A * | 2/2017 | ............ C09J 161/24 |
| EP | 2341095 | 7/2011 | |
| FI | 107951 B * | 10/2001 | ............. D21H 21/18 |
| JP | 1138728 | 5/1989 | |

(Continued)

OTHER PUBLICATIONS

Kim, "Thermoplastic Modificaion of Urea-Formaldehyde Wood Adhesives to Improve Moisture Resistance", Journal of Applied Polymer Science, 2006, vol. 101, Issue 6, pp. 4222-4229.

(Continued)

*Primary Examiner* — Sanza L. McClendon

(57) ABSTRACT

The present invention provides modified urea formaldehyde (UF) resin binder compositions and mineral fiber mats having an emulsion polymer modifier comprising, in copolymerized form, from 5 to 25 wt. % of co polymerized carboxylic acid functional monomers. The emulsion polymers have a measured glass transition temperature (DSC) ranging from −40° C. to 70° C. and a large average particle size. Further, the emulsion polymers comprise less than 30% of the copolymerized acid in neutralized form and do not excessively thicken aqueous compositions containing them. The modified UF resin binder compositions enable good dilution stability in use and high tensile strength in products containing them.

9 Claims, No Drawings

(56) References Cited

U.S. PATENT DOCUMENTS

| | | | |
|---|---|---|---|
| 2005/0070186 A1* | 3/2005 | Shoemake | C08J 5/04 |
| | | | 442/180 |
| 2007/0178789 A1 | 8/2007 | Xing et al. | |
| 2008/0015301 A1 | 1/2008 | Grooms et al. | |
| 2009/0124151 A1* | 5/2009 | Shoemake | C09J 161/24 |
| | | | 525/154 |
| 2009/0155474 A1 | 6/2009 | Finley et al. | |
| 2012/0058277 A1* | 3/2012 | Bohling | C08F 2/001 |
| | | | 526/277 |
| 2015/0093513 A1 | 4/2015 | Brady et al. | |
| 2015/0093952 A1 | 4/2015 | Finch et al. | |
| 2015/0166744 A1* | 6/2015 | Hannen | B29C 48/0012 |
| | | | 521/141 |
| 2019/0106563 A1* | 4/2019 | Zhang | C08K 5/17 |
| 2021/0355629 A1* | 11/2021 | Woelfle | D06M 15/37 |
| 2025/0277067 A1* | 9/2025 | Vorholz | C08K 3/08 |

FOREIGN PATENT DOCUMENTS

| | | | | |
|---|---|---|---|---|
| JP | 3229749 B2 | 11/2001 | | |
| JP | 2004339310 A | 12/2004 | | |
| WO | 2008150647 | 12/2008 | | |
| WO | WO-2008150647 A1 * | 12/2008 | | C08L 61/24 |
| WO | 2011068984 A2 | 6/2011 | | |
| WO | 2015199985 A1 | 12/2015 | | |

OTHER PUBLICATIONS

International Preliminary Report on Patentability from corresponding International Application No. PCT/US2021/042863 dated Feb. 7, 2023.

* cited by examiner

HIGH ACID ACRYLIC STYRENE ACRYLIC AND ACRYLIC EMULSION COPOLYMER MODIFIED UREA FORMALDEHYDE BINDERS FOR MINERAL FIBERS

FIELD OF THE INVENTION

The present invention relates to aqueous binder compositions comprising high acid acrylic or styrene acrylic emulsion polymer modified urea formaldehyde resins (UF resins) and methods for using the compositions to make fiber or fiberglass mat products.

BACKGROUND OF THE INVENTION

Glass fiber mats, and fiber mats made from synthetic fibers and fiber blends find wide application in the building materials industry, for example, as insulation, as a substrate for making composite flooring, or as a substrate for making roofing shingles. Fiber mats, and especially glass fiber mats, are commonly made commercially by a wet-laid process which is carried out on what can be viewed as modified paper-making equipment. In this process, a fiber slurry is deposited on the moving screen or cylinder is processed into a sheet-like fiber mat by the removal of water, usually by suction and/or vacuum devices. A resinous or polymeric binder is then applied to the thus formed fiber mat to hold the fiber mat together. After applying the binder, the mat is set or cured with heating to provide the desired mat integrity.

Widely used binder formulations for making fiber mats, especially glass fiber mats, comprise a thermosetting urea-formaldehyde (UF) resin. UF resins have commonly been employed because they are relatively inexpensive. However, the manufacture of glass fiber mats with a binder consisting essentially of a UF resin results in mats which are often brittle. And, especially as the glass fiber mats are subjected to stress during the manufacturing process, strength development at early cure times is needed to avoid process delays and shutdowns caused by breaks in the continuous mat line. So, UF resin binder compositions also may include a polymeric binder comprising an emulsion polymer or solution polymer which imparts mat strength properties to the ultimately cured mat, and can improve the mat strength early during the curing process as it is transported from its initial formation into and through the curing oven.

U.S. Pat. No. 6,642,299 B2 to Wertz et al. disclose urea formaldehyde resin binders containing an additive comprising a solution of styrene-maleic anhydride copolymers as water soluble UF modifiers, including physical blends thereof with a small amount, not disclosed, of styrene acrylic acid or styrene-acrylate emulsion copolymers, wherein the additive comprises up 10 wt. % of binder solids and does not include emulsion copolymers having acid. To avoid gelation of the binder from reaction of the acid in the additive with the UF resin, the pH of the Wertz composition has to be maintained at a preferred 7 to 8.5 range, and the amount of additive polymer as well as the acid content of the overall Wertz binder composition kept very low.

The present inventors have endeavored to solve the problem of providing aqueous polymer modified UF resin binder compositions for use, for example, in asphalt coated roofing shingles having good storage stability while enabling fiber mats having improved tensile strength as well as flexibility.

SUMMARY OF THE INVENTION

In accordance with the present invention, aqueous modified urea formaldehyde resin (UF resin) binder compositions comprise the UF resin and from 2.5 to less than 15 wt. %, or, preferably, from 5 to 12.5 wt. %, of at least one emulsion polymer as modifier, based on total solids of the UF resin binder compositions, the emulsion polymer having a pH of from 4 to 7.5, or, preferably, from 4 to less than 7.0, or, more preferably, from 4 to 6.5, wherein the emulsion polymer comprises, in copolymerized form, (i) one or more alkyl esters of (meth)acrylic acid, or a mixture thereof with one or more vinyl aromatic monomers, and (ii) one or more ethylenically unsaturated carboxylic acid group containing monomers, preferably, acrylic acid or methacrylic acid, in the amount of from 5 to 25 wt. % or, preferably, from 10 to 20 wt. %, based on the total weight of all monomers used to form the emulsion copolymer, and, further wherein, the emulsion polymer has a measured glass transition temperature (DSC) ranging from −40° C. to 70° C., or, preferably, from −30° C. to 60° C. Preferably, the vinyl aromatic monomer is chosen from styrene or α-methyl styrene.

The emulsion polymer in the modified urea formaldehyde resin binder compositions in accordance with the present invention may comprise an emulsion copolymer wherein, in copolymerized form, the (i) one or more alkyl esters of (meth)acrylic acid are chosen from a) a mixture of butyl acrylate, ethyl acrylate, methyl acrylate, ethylhexyl methacrylate with at least one $C_1$ to $C_{18}$ alkyl ester of (meth) acrylic acid other than butyl acrylate, ethyl acrylate, methyl acrylate, or ethylhexyl methacrylate, b) mixtures of any of butyl acrylate, ethyl acrylate, methyl acrylate, or ethylhexyl methacrylate with methyl methacrylate; or c) the mixture a) or b) with one or more vinyl aromatic monomers.

The emulsion polymer in the modified urea formaldehyde resin binder compositions in accordance with the present invention may comprise an emulsion polymer of, in copolymerized form, from 0 to 2 wt. %, based on the total weight of all monomers used to form the emulsion copolymer, of one or more multiethylenically unsaturated crosslinking monomers, such as allyl methacrylate.

The emulsion polymer in the modified urea formaldehyde resin binder compositions in accordance with the present invention may have a weight average molecular weight of from 100,000 to 2,000,000, or, preferably, from 300,000 to 1,500,000, or, preferably, from 400,000 to 1,000,000.

The emulsion polymer in the modified urea formaldehyde resin binder compositions in accordance with the present invention may have a weight average particle size of from 100 to 500 nm, or, preferably, from 170 to 400 nm.

The modified urea formaldehyde resin binder compositions in accordance with the present invention may be substantially free of emulsion polymers containing, in copolymerized form, phosphorous and/or sulfur acid containing monomers. However, the compositions of the present invention may contain molecular weight regulators containing phosphorous and/or sulfur, such as, for example sodium hypophosphite and n-dodecyl mercaptan.

The modified urea formaldehyde resin binder compositions in accordance with the present invention comprise 2 wt. % or less, or, preferably, 1 wt. % or less, each weight % based on total solids in the modified UF resin binder compositions, or, more preferably, may be substantially free of solution polymers comprising, in copolymerized form, more than 50 wt. %, based on the total weight of all monomers used to form the emulsion copolymer, of ethylenically unsaturated carboxylic acid group containing monomers.

The modified urea formaldehyde resin binder compositions in accordance with the present invention may comprise 5 wt. % or less, or, preferably, 0.5 wt. % or less, or, more preferably, 0.1 wt. % or less of a phenolic resin, based on total binder composition solids.

In another aspect in accordance with the present invention, mineral fiber mats such as, preferably, roofing shingles, comprise a web of mineral fibers, preferably, glass fibers, and a modified urea formaldehyde resin (UF resin) binder composition in the amount of from 5 to 30 wt. %, based on the total solids basis of mineral fiber plus the modified UF resin binder compositions, the binder comprising from 85 to 97.5 wt. % of the urea formaldehyde resin and as a modifier from 2.5 to less than 15 wt. %, or, preferably, from 5 to 12.5 wt. %, of at least one emulsion polymer, all binder composition weights based on total binder solids weight, wherein the emulsion polymer has a pH of from 4 to 7.5, or, preferably, from 4.0 to less than 7.0 and comprises, in copolymerized form, (i) one or more alkyl esters of (meth) acrylic acid, or a mixture thereof with one or more vinyl aromatic monomers, and (ii) one or more ethylenically unsaturated carboxylic acid group containing monomers, preferably, acrylic acid or methacrylic acid, in the amount of from 5 to 25 wt. % or, preferably, from 10 to 20 wt. %, based on the total weight of all monomers used to form the emulsion copolymer, and, further wherein, the emulsion polymer has a measured glass transition temperature (DSC) ranging from −40° C. to 70° C., or, preferably, from −35° C. to 60° C. Preferably, the vinyl aromatic monomer is chosen from styrene or α-methyl styrene.

The modified UF resin binder compositions in the mineral fiber mats in accordance with the present invention may comprise any of the binder compositions disclosed above in the "Summary of the Invention," including all of the disclosed preferreds.

In yet another aspect, the present invention provides methods comprising forming modified urea formaldehyde resin (UF resin) binder compositions from UF resin and from 2.5 to less than 15 wt. %, or, preferably, from 5 to 12.5 wt. %, of at least one emulsion polymer, based on total solids of the UF resin binder compositions, of at least one emulsion polymer as modifier, and applying the composition to a wet laid continuous glass fiber mat and heating to cure the composition, wherein the emulsion polymer comprises, in copolymerized form, (i) one or more alkyl esters of (meth) acrylic acid, or a mixture thereof with one or more vinyl aromatic monomers, and (ii) one or more ethylenically unsaturated carboxylic acid group containing monomers, preferably, acrylic acid or methacrylic acid, in the amount of from 5 to 25 wt. % or, preferably, from 10 to 20 wt. %, based on the total weight of all monomers used to form the emulsion copolymer, and, further wherein, the emulsion polymer has a measured glass transition temperature (DSC) ranging from −40° C. to 70° C., or, preferably, from −35° C. to 60° C. In the methods in accordance with the present invention, the emulsion polymer modifiers may have a pH of from 4 to 7.5, or, preferably, from 4 to 7. Preferably, the vinyl aromatic monomer in the emulsion polymer is chosen from styrene or α-methyl styrene. The methods according to the present invention have particular utility for making glass mat binders for roofing shingles, such as asphalt coated roofing shingles.

DETAILED DESCRIPTION OF THE INVENTION

In accordance with the methods of the present invention, modified urea formaldehyde resin (UF resin) binder compositions comprise a high acid content emulsion polymer that provides a binder have good shelf and dilution stability.

In addition, the modified UF resin binder compositions enable the provision of mineral fiber mats having both good flexibility and tensile strength properties. The modified UF resin binder compositions enable the provision of mineral fiber or glass mats such as roofing shingles, for example, asphalt coated roofing shingles having enhanced durability. Meanwhile, because the modified UF resin binder compositions comprise emulsion polymers and are substantially free of solution polymers, the binder compositions remain at reasonable viscosity levels under application conditions throughout their formulation and application to the mineral fiber mat to ensure that the wet web surface is fully treated with binder. The emulsion polymer modifiers of the present invention enable the aqueous UF resin binder compositions to flow to all parts of the mat while enabling a UF resin to develop early cure strength and thereby limit the risk of a breakage of the continuous mineral fiber mat web substrate. Full treatment or coverage of the glass mat surface area is very important. If the entire mineral fiber mat wet web is not treated uniformly with binder, dramatically increasing the odds of glass mat web breakage. The emulsion polymer modifiers are substantially formaldehyde free.

Unless otherwise indicated, all temperature and pressure units are room temperature (21 to 23° C.) and standard pressure (1 atm). In addition, unless otherwise indicated, all conditions include a relative humidity (RH) of 40%.

Unless the context clearly dictates otherwise, the singular forms "a," "an," and "the" include plural referents.

Unless defined otherwise, technical and scientific terms used herein have the same meaning as is commonly understood by one skilled in the art.

All ranges are inclusive and are combinable. Thus, for example, the disclosure of a composition which comprises 5 wt. % or less, or, preferably, 0.5 wt. % or less, or, more preferably, 0.1 wt. % or less of a phenolic resin will be read as including ranges of from 0 to 5 wt. %, from 0 to 0.1 wt. %, from 0 to 0.5 wt. %, from 0.1 to 5 wt. % and from 0.5 to 5 wt. %.

All phrases comprising parentheses denote either or both of the included parenthetical matter and its absence. For example, the phrase comprising "(meth)acrylate" includes, in the alternative, acrylate and methacrylate.

As used herein, the term "aqueous" or "aqueous solvent" includes water and mixtures composed substantially of water and water-miscible solvents.

Unless otherwise indicated, as used herein, the term "average particle size" or "PS" refers to a weight average particle size as determined using a Brookhaven BI-90 instrument (Brookhaven Instruments Corporation, Austin, TX).

Unless otherwise indicated, as used herein, the phrase "binder application conditions" means ambient, or room temperature (21 to 23° C.), and standard pressure.

As used herein, the phrase "based on the total weight of monomers used to form the emulsion polymer," refers to all addition monomers, such as, for example, carboxylic acid functional vinyl or ethylenically unsaturated monomers, and chain transfer agents which leave a residue in the polymer, such as hypophosphites or their salts.

Unless otherwise indicated, as used herein, the term "molecular weight" or "Mw" refers to a weight average molecular weight as determined by aqueous gel permeation chromatography (GPC) using tetrahydrofuran (THF) as solvent at 40° C., 3 columns of varying resolution, such as PLgel Columns (Polymer Labs), 100 Angstrom, $10^3$, $10^4$ Angstroms, 30 cm long, 7.8 mm inner diameter (ID), 1 mil/min, 100 microliter injection volume, calibrated to narrow polystyrene standards using software, such as, Polymer Labs CALIBRE™ software. The system was calibrated using poly(styrene) standards. As used herein, the units of Mw are grams/mole (g/mole).

As used herein the term "substantially free" of any materials or ingredients, such as formaldehyde, a volatile amine, a sulfur containing monomer, or a solution polymer refers to any of compositions, articles containing them and methods of making or using them wherein the referenced compositions, articles or methods containing no such added materials or ingredients.

As used herein, the term "measured glass transition temperature" or "measured Tg" refers to the Tg of an emulsion polymer determined by differential scanning calorimetry (DSC) according to the examples, below: A 10 milligram sample was dried in an aluminum DSC sample pan at 60° C. overnight, the sample pan was then transferred to the DSC instrument (a TA Instruments Q2000) where the sample was heated to 120° C., rapidly cooled to −100° C., and data collected while ramping the temperature at 10° C./minute from −50 to 200° C., reporting the midpoint in the inflection of the data curve.

As used herein, the phrase "total solids" or "based on the total binder solids" or its equivalent refers to weight amounts of any given ingredient in comparison to the total weight amount of all of the non-volatile ingredients in the binder or the referenced composition. Volatile ingredients include both water and ammonia as well as volatile solvents that volatilize at standard pressure and 40° C. or less.

As used herein, the term "use conditions" means standard pressure and temperatures ranging from the ambient temperature to the upper end of the disclosed binder cure temperature.

As used herein, the term "wt. %" stands for weight percent.

The modified UF resin binder compositions and mineral fiber mats in accordance with the present invention comprise an emulsion copolymer modifier which has a large percentage of copolymerized carboxylic acid functional monomers. The emulsion polymers comprise from 5 to 25 wt. % of an ethylenically unsaturated carboxylic acid group containing monomer, based on the total weight of all monomers used to form the emulsion copolymer. In contrast to conventional polymers made from ethylenically unsaturated carboxylic acid group containing monomers, such as solution polymers or alkali selling emulsions (ASEs), the emulsion polymers of the present invention are not water soluble and are not swollen in alkali. In fact, the pH of the emulsion polymers is maintained below neutral, such as at from pH 4 to 7.5, or from 4 to 7 which keeps the viscosity of the modified UF resin binder compositions low and prevents the emulsion polymers from reacting with the urea formaldehyde resin until the desired time, such as during curing. The emulsion polymers thus do not include ammonia or another neutralizing agent in amounts that would raise the pH above the desired range. The emulsion polymers of the present invention comprise less than 30%, or, preferably, less than 25%, or, more preferably, less than 15%, of its carboxylic acid groups in a neutralized form. Thus, if the polymer has 15 wt. % of carboxylic acid groups, in copolymerized form, based on the total weight of monomers used to make the polymer, 4.5% or less of the polymer comprises neutralized acid (carboxylate) groups, based on the total weight of monomers used to make the polymer.

Suitable modified UF resin binder compositions comprise the UF resin and from 2.5 to less than 15 wt. %, or, preferably, from 5 to 12.5 wt. %, of at least one emulsion polymer as modifier, based on total solids of the UF resin, the emulsion polymers having a pH of from 4 to 7, wherein the emulsion polymer comprises, in copolymerized form, (i) one or more alkyl esters of (meth)acrylic acid, or a mixture thereof with one or more vinyl aromatic monomers, and (ii) one or more ethylenically unsaturated carboxylic acid group containing monomers in the amount of from 5 to 25 wt. % or, preferably, from 10 to 20 wt. %, based on the total weight of all monomers used to form the emulsion copolymer, and, further wherein, the emulsion polymer has a measured glass transition temperature (DSC) ranging from −50° C. to +70° C., or, preferably, from −30° C. to +60° C. Preferably, if used, the vinyl aromatic monomer is chosen from styrene or α-methyl styrene.

Suitable (i) alkyl esters of (meth)acrylic acid, useful in making the emulsion polymers of the present invention may include, for example, butyl acrylate, ethyl acrylate, methyl acrylate, ethylhexyl methacrylate, or $C_1$ to $C_{18}$ alkyl ester of (meth)acrylic acid other than butyl acrylate, ethyl acrylate, methyl acrylate, or ethylhexyl methacrylate, such as methyl methacrylate, ethyl methacrylate, hexyl (meth)acrylate, or fatty (meth)acrylates like lauryl methacrylate. Suitable (i) vinyl aromatic monomers useful in making the emulsion polymers of the present invention may include, for example, styrene, α-methyl styrene, vinyl toluene, or $C_2$ to $C_8$ alkyl styrenes.

Suitable (ii) "ethylenically unsaturated carboxylic acid group containing monomers" that are useful in making the polymers of the present invention may include, for example, methacrylic acid, acrylic acid, itaconic acid and maleic acid or its anhydride, preferably, acrylic acid and methacrylic acid.

The upper limit of the (ii) ethylenically unsaturated carboxylic acid group containing monomer represents the amount that allows an emulsion polymer to be produced at a practical solids level of 40 wt. % or higher with acceptable viscosity and an acceptably low coagulum level.

The emulsion polymer in the modified urea formaldehyde resin binder compositions in accordance with the present invention may comprise an emulsion polymer of, in copolymerized form, from 0 to 2 wt. %, based on the total weight of all monomers used to form the emulsion copolymer, of one or more multi-ethylenically unsaturated crosslinking monomers, such as allyl methacrylate.

In weatherable mineral fiber mat applications, such as for roofing shingles, the preferred total amount of (i) vinyl aromatic monomers useful in making the emulsion polymers of the present invention comprises 15 wt. % or less, or, more preferably, 11 wt. % or less, based on the total weight of all monomers used to form the emulsion copolymer.

Preferably, to enhance the flexibility of mineral fiber mats made therefrom, the emulsion polymers in accordance with the present invention, specifically do not comprise, in copolymerized form, monomers comprising N-methylol groups, such as N-methylolacrylamide or N-methylolmethacrylamide, or glycidyl functional monomers.

The emulsion polymer modifiers of the present invention comprise aqueous emulsion polymers, such as those formed in the presence of an emulsifier or surfactant. Such emulsion polymers can be prepared by conventional aqueous emulsion polymerization methods, such as in the presence of an initiator like a peroxide, such as dibutyl peroxide, a peracid, such as a persulfate, or a sulfinic acid or its salt. The emulsion polymerization may include one or more chain transfer agent, such as, for example, mercaptans.

The emulsion polymer in the modified urea formaldehyde resin binder compositions in accordance with the present invention may have a molecular weight of from 100,000 to 2,000,000, or, from 300,000 to 1,500,000 or more, or, preferably, from 400,000 to 1000000.

The emulsion polymer in the modified urea formaldehyde resin binder compositions in accordance with the present invention may have a weight average particle size of from 100 to 500 nm, or, preferably, from 170 to 400 nm.

The emulsion polymer in the modified UF resin binder compositions of the present invention may have a solids content of from 40 to 60 wt. %.

Suitable urea formaldehyde (UF) resins for use in accordance with the present invention are well known and widely commercially available. They are formed, for example, from the reaction of urea and formaldehyde to form compounds containing methylol groups, which subsequently react further or condense, or cure to form polymers under the application of heat, with or without catalysts. The methylol groups in the UF resin are known to react with active hydrogen groups such as other methylol groups to form ether or methylene groups thereby forming polymeric structures. Such polymeric structures are generally brittle and nonwovens containing them as binders tend to be relatively inflexible. Examples of commercially available urea formaldehyde resins include Casco-Resin FG-413F resin (Borden, Inc.) and GP™ 2980 RESI-MAT™ glass mat binder resin (Georgia-Pacific).

The modified urea formaldehyde resin binder compositions in accordance with the present invention may be substantially free of emulsion polymers containing, in copolymerized form, phosphorous and/or sulfur acid containing monomers.

The modified urea formaldehyde resin binder compositions in accordance with the present invention comprise 2 wt. % or less, or, preferably, 1 wt. % or less, each weight % based on total solids in the modified UF resin binder compositions, or, more preferably, may be substantially free of solution polymers comprising, in copolymerized form, more than 50 wt. %, based on the total weight of all monomers used to form the emulsion copolymer, of ethylenically unsaturated carboxylic acid group containing monomers.

The modified UF resin binder compositions of the present invention may comprise from 0.01 to 2 wt. %, based on the total solids of the binder compositions, of each of additives, including surfactants or dispersants to adjust surface tension, silane coupling agents, dedusting oils, white water flocculants, such as polyacrylamides.

The modified UF resin binder compositions of the present invention should have a viscosity of from 5 to 60 centipoises (cPs) at 25° C. at 15 wt. % solids (diluted with water), and 30 rpm of shear as measured on a DV-Ill Ultra LV Brookfield viscometer, or, preferably, 40 cPs or less, or, more preferably, 30 cPs or less.

In yet another aspect, the present invention provides methods comprising forming modified urea formaldehyde resin (UF resin) binder compositions from UF resin and applying the composition to a wet laid continuous glass fiber mat and heating to cure the composition. The aqueous binder compositions prepared according to the present invention have particular utility as glass mat binders for roofing shingles, such as asphalt coated roofing shingles. The forming methods include mixing the emulsion polymer, any additives and the UF resin and then diluting the resulting composition prior to application.

To form the binder compositions of the present invention, the emulsion polymer can be added to the UF resin prior to, at or just prior to use, or the emulsion polymer and any additives may be supplied in the form of an additive blend which is then added to the UF resin and diluted with water to form the modified UF resin binder composition. The modified UF resin binder compositions can be formed up to 3 days prior to or immediately prior to application in the presence of shear and at temperatures of up to 70° C. The modified UF resin binder compositions in accordance with the present invention exhibit excellent dilution stability.

The methods of using the modified UF resin binder compositions of the present invention comprise treating a wet laid fibrous glass mat with the binder composition by soaking the mat in an excess of binder composition, or by coating or impregnating binder directly into the fibrous mat, e.g. with a falling film curtain coater and then curing the binder. Curing comprises heat treating the binder treated mat at from 100 to 400° C., or, preferably, from 180 to 260° C.

Preferably, the treating in the method of the present invention comprises soaking the fibrous glass mat in an excess of a binder composition, or coating or impregnating binder directly into the fibrous mat, e.g. with a falling film curtain coater.

Aside from making roofing shingles, the treated glass mats of the present invention may be used as a substrate for making composite flooring, as a substrate for making siding (replacing similar sheets traditionally made using wood, cellulose or asbestos fibers), as a substrate for printed circuit boards or battery separators, as filter stock, as tape stock, as reinforcement scrim in cementitious and non-cementitious coatings for masonry, and as facing material for laminated articles such as foam composites and gypsum boards.

The following examples illustrate the present invention. Unless otherwise indicated, all parts and percentages are by weight and all temperatures are in ° C.

EXAMPLES

In the examples and Tables 1, 2 and 3 that follow, the following abbreviations were used: AA: acrylic acid, AN: Acrylonitrile; BA: butyl acrylate, DVB: Divinyl Benzene; IA: itaconic acid, MAA: methacrylic acid, MMA: Methyl methacrylate, nMOA: n-methylol methacrylamide, S: Styrene, SHP: sodium hypophosphite, SSS: Sodium styrene sulfonate; RT: Room Temperature.

In the examples that follow, the following test methods were used.

Tensile Strength: The aqueous curable compositions in Table 1, below, were evaluated for dry tensile strength on glass microfiber filter sheets (20.3×25.4 cm, Cat. No. 1820-866, Whatman International Ltd., Maidstone, England). Each sheet was dipped in each binder composition, placed between two cardboard sheets of similar dimensions, and run through a roll padder with roll pressure of 68.9 kPa (10 psi). The coated sheets were then dried by heating at 90° C. for 1.5 minutes in a Mathis oven. Post drying weight was determined to calculate binder add-on (15%+/−2% by weight binder add-on). Dried sheets were then cured in a Mathis oven at a temperature of 190° C. for 60 sec and 180 sec, as indicated. The cured sheets were cut into 2.54 cm (1 in) by 10.16 cm (4 in) strips and tested for tensile strength in the machine direction using a Thwing Albert Tensile Tester (Thwing Albert Instrument Company, West Berlin, NJ) equipped with a 1 kN load cell. The fixture gap was 2.54 cm (1 in) and the crosshead speed was 2.54 cm/min (1 in/min). Strips were tested either "as is" at room temperature conditions (Room Temperature Tensile Strength, RT-TS) or immediately after 30 minutes of immersing in water which is maintained at a temperature of 80° C. Tensile strengths were recorded as the peak force measured during parting.

Data reported are averages of values recorded from measuring 20 to 30 treated and cured strips per filter sheet for each binder composition tested. Acceptable values for Room Temperature tensile strength fully cured at 180 seconds, are those higher than 20 N, or, preferably, above 25 N. Results are presented in Table 2, below.

Dilution Stability was tested by diluting the indicated binder composition with whitewater in 20 ml vials and mixing or shaking on shaker, followed by observation by eye at the indicated intervals or times. Unstable mixtures are defined as those which develop sediment/film, gel, or phase separation. The results are considered to be progressively unstable from phase separation to formation of a sediment/film which ultimately cannot be redispersed. In particularly unstable mixtures, the sediment/film persists with agitation. For the 2:1 test 1.0 ml of each undiluted aqueous binder composition was mixed in a test tube with 2.0 ml of whitewater comprising 0.06 wt. %, as solids, of a mixture of a polyacrylamide thickener and an alkylamine dispersant, and tested for stability after the indicated time and temperature. For the 5:1 test 1.0 ml each aqueous binder composition is mixed with 5.0 ml of the whitewater in a test tube and tested for stability after 24 hours at room temperature, and at any other indicated times and temperatures. Results are presented in Table 3, below.

The Stability Rating System for the data reported in Table 3, below, and associated abbreviations is as follows: Homogeneity or the first letter refers to whether the binder mixture is in a single liquid phase (homogeneous) or phase separated into two liquid phases (generally present as 2 layers). Ratings are H (homogeneous), S (separated) or TS (Totally Separated). Sedimentation or the second letter refers to the accumulation and degree of sediment in a binder mixture Ratings are N.S. (no sediment or film on top of sample); F (film forms at a liquid Surface); S (sediment present). Redispersibility or the third letter in series tests how sediment or film responds when test tube is inverted. Ratings are D (sediment/film disperses, resulting in clean test tube bottom); D.N.D. (sediment/film does not disperse, but persist even with test tube inversion). The term "swirl' is used to describe the situation when a mixture does not have distinct multiple layers of liquid or Solid phases present, but nonetheless there appears to be some slight level of clear liquid/clear liquid phase incompatibility. Unstable mixtures are defined as those which develop sediment, gel, or phase separation. The results are considered to be progressively unstable as phase separation and sediment/film forms. The mixture particularly unstable is the sediment/film persists with agitation (test tube inversion).

Synthesis Example A: Emulsion Polymer Synthesis: A 5-liter round-bottom flask equipped with a paddle stirrer, thermocouple, nitrogen inlet, and reflux condenser was charged with 296.2 grams of deionized water and 0.025 grams of an inhibitor then heated to 88° C. A monomer emulsion was prepared from 230.7 grams of deionized water, 41.1 grams of a 30% aqueous solution of sodium laurel ether sulfate surfactant diluted with 30 grams of deionized water, 700.8 grams of BA, 123.7 grams of AA. At 88° C., a solution of 12.4 grams of SHP dissolved in 18.9 grams of deionized water was added to the reaction flask, followed by a mixture of 2.84 grams of sodium hydroxide dissolved in 10 grams of deionized water was then added to the flask. 13.1 grams of a 30% aqueous solution of sodium lauryl ether sulfate surfactant diluted with 10 grams of deionized water.

A 45.7 gram aliquot of the monomer emulsion was added to the flask followed by 3.39 grams of ammonium persulfate dissolved in 15.30 grams deionized water. After waiting for a peak exotherm (5-10 minutes), gradual addition of the remaining monomer emulsion and a separate solution of 3.43 grams of ammonium persulfate dissolved in 72.3 grams of deionized water was performed over 130 minutes, while maintaining a temperature of 86° C. First 20 min the feed was at 50% rate and after that at 100% rate. After this addition was complete, the reaction mixture was held at 86° C. for 10 minutes. After the hold, a gradual addition of 39.4 grams of sodium hydroxide dissolved in 199.2 grams of deionized water was added over 20 minutes, followed by a 10 minute hold. After the hold and with kettle temperature about 75° C., a solution of 3.64 grams aqueous tert-butyl-hydroperoxide (70 wt. %) diluted with 14.3 grams of deionized water and a separate solution of 2.5 grams of sodium bisulfite dissolved in 28.9 grams of deionized water was gradually added to reaction mixture over 30 minutes, followed by a 15 minute hold. After this hold, a solution of 3.64 grams aqueous tert-butylhydroperoxide (70 wt. %) diluted in 14.3 grams of deionized water and a separate solution of 2.5 grams of sodium bisulfite dissolved in 28.9 grams of deionized water was gradually added to reaction mixture over 30 minutes, followed by a 15 minute hold. After this hold, the reaction mixture was cooled to room temperature. The resulting emulsion polymer product was filtered through 100 and 325 mesh screens with only trace amounts of coagulum being collected.

The resulting emulsion polymer of Example 7 had a solids content of 45.3% measured by drying a ~0.5 gram sample in a 150° C. forced air oven for 30 minutes and a pH of 4.8. The average particle size of the emulsion polymer particles, as measured with a Brookhaven BI-90 instrument, was 188 nm. The Tg of the emulsion polymer was determined by differential scanning calorimetry (DSC): ~10 milligram sample was dried in an aluminum DSC sample pan at 60° C. overnight, the sample pan was then transferred to the DSC instrument (a TA Instruments Q2000) where the sample was heated to 120° C., rapidly cooled to −100° C., and data collected while ramping the temperature at 10° C./minute from −50° C. to 150° C. The measured Tg of the emulsion polymer was −34° C.

Three samples with each different monomer composition were prepared with the above synthesis procedure. Examples 8, 9, 10, 11, and 12 from Table 1 followed the synthesis procedure described above. All emulsion polymers shown in Table 1, below, were formed in the manner set forth in Synthesis Example A, except that the monomer emulsions were changed according to the emulsion polymer composition.

In the Examples the follow, urea formaldehyde (UF) supplied at 65.5% solids by weight, was blended with the following aqueous polymer solutions by simple mixing using a Caframo™ type RZR50 stirrer (Warton, Ontario, CA) equipped with a 2.54 cm diameter stirring blade and agitated to achieve a stable vortex for 10 minutes, at ambient temperature conditions. Each binder was then diluted with water to a solids content of 15 wt. %. Unless otherwise indicated, all binder compositions comprise a mixture, as solids, of 90 wt. % of UF resin and 10 wt. % of emulsion polymer.

TABLE 1

Binder Compositions

| Example | Composition | |
|---|---|---|
| 1* | UF resin FG 413 ™ (Momentive Performance Materials, Philadelphia, PA) | Control-no polymer |
| 2* | Emulsion polymer modifier (51 wt. % EA/45 MMA wt. %/4 nMOA wt. %) | Comparative: Low acid, Tg +35° C.; pH 7.5-8.0 |
| 3* | [QRXP 1793]1 wt. % on solids of a poly-methacrylic acid (pMAA) made from 89.29 wt. % MAA/2.68% initiator/and 8.03 wt. % SHP (5,000 Mw) | Comparative solution polymer modifier; pH 2.5 |
| 4* | BA 83.8 wt. %/MMA 6.5 wt. %/ AN 6 wt. %/MAA 2.3 wt. %/ureido ethyl methacrylate 1.5 wt. % | Comparative: Tg −40° C.; pH 9.0-9.6 |
| 5* | BA 89 wt. %/ureido ethyl methacrylate 1 wt. %/AN 6.8 wt. %/AA 1 wt. %/IA 0.4 wt. %/SSS 0.46 wt. % | Comparative; |
| 6* | pMAA as in Example 3, neutralized with ammonia | Comparative neutralized solution polymer modifier; |
| 7 | BA 85 wt. %/AA 15 wt. % | Inventive; Tg~−34° C. |
| 8 | BA 84 wt. %/AA 15 wt. %/ DVB 1 wt. % | Inventive; Tg~−32° C. |
| 9 | BA 83 wt. %/AA 15 wt. %/ DVB 2 wt. % | Inventive; Tg~−31° C. |
| 10 | BA 52.3 wt. %/STY 32.7 wt. %/AA 15 wt. % | Inventive; Tg~10° |
| 11 | BA 30.9 wt. %/STY 54.1 wt. %/AA 15 wt. % | Inventive; Tg~55° C. |

*Denotes comparative Example

TABLE 2

Dry Tensile Strength

| Example | $TS_f$, N | Std. Dev., N |
|---|---|---|
| 1* | 23.0583 | 0.5190 |
| 2* | 25.9370 | 0.5548 |
| 4* | 19.2560 | 1.4679 |
| 5* | 21.6540 | 1.4679 |
| 7 | 25.7633 | 1.4679 |
| 8 | 28.5047 | 1.0379 |
| 9 | 26.3470 | 1.0379 |
| 10 | 29.5993 | 1.4679 |
| 11 | 29.6107 | 1.4679 |

*Denotes comparative Example

As shown in Table 2, above, the high acid emulsion polymers of all of inventive examples 7, 8, 9, 10 and 11 all dramatically outperform the comparative compositions, even those having a high carboxylic acid content. The exceptional example, Comparative Example 2 contains n-methylol acrylamide which is known to generate formaldehyde in use and in products containing it and so is not substantially formaldehyde free.

As shown in Table 3, below, all of the inventive examples 8, 10 and 11 gave the highest or very close to the highest dilution stability ratings after 48 hours and were dramatically better than the dilution stability of Comparative Examples 1, 3 and 6 which includes simple UF resins. The Comparative Example 4 which gave reasonable dilution stability is a very soft, low acid emulsion polymer which fails to provide good tensile data, as shown in Table 2, above.

TABLE 3

Dilution Stability

| Example | Dilution | 60 C. 1 hr | RT 1 hr | RT 2 hr | RT 24 hrs | RT 48 hrs |
|---|---|---|---|---|---|---|
| 3* | stock | cured | H, F, D | H, F, D | cured | cured |
| | 2:1 | S, S, DND | TS, S, DND | TS, S, DND | cured | cured |
| | 5:1 | TS, S, DND | TS, S, DND | TS, S, DND | TS, S, DND | TS, S, DND |
| 1* | stock | H, NS, D | H, NS, D | H, NS, D | H, NS, D | H, NS, D |
| | 2:1 | H, NS, D | H, NS, D | S, NS, D | S, NS, D | S, NS, D |
| | 5:1 | H, NS, D | H, NS, D | S, NS, D | S, NS, D | S, NS, D |
| 6* | stock | H, NS, D | H, NS, D | H, NS, D | H, F, D | cured |
| | 2:1 | H, NS, D | H, NS, D | H, NS, D | H, F, D | cured |
| | 5:1 | H, NS, D | H, NS, D | H, NS, D | H, NS, D | cured |
| 4* | stock | H, NS, D | H, NS, D | H, NS, D | H, NS, D | H, NS, D |
| | 2:1 | H, NS, D | H, NS, D | H, NS, D | H, NS, D | H, NS, D |
| | 5:1 | H, NS, D | H, NS, D | H, NS, D | H, NS, D | H, NS, D |
| 8 | stock | H, NS, D | H, NS, D | H, NS, D | H, NS, D | H, F, D |
| | 2:1 | H, NS, D | H, NS, D | H, NS, D | H, NS, D | H, NS, D |
| | 5:1 | H, NS, D | H, NS, D | H, NS, D | H, NS, D | H, F, D |
| 10 | stock | H, NS, D | H, NS, D | H, NS, D | H, NS, D | H, NS, D |
| | 2:1 | H, NS, D | H, NS, D | H, NS, D | H, NS, D | H, NS, D |
| | 5:1 | H, NS, D | H, NS, D | H, NS, D | H, NS, D | H, NS, D |
| 11 | stock | H, NS, D | H, NS, D | H, NS, D | H, NS, D | H, NS, D |
| | 2:1 | H, NS, D | H, NS, D | H, NS, D | H, NS, D | H, NS, D |
| | 5:1 | H, NS, D | H, NS, D | H, NS, D | H, NS, D | H, NS, D |

*Denotes comparative Example

We claim:

1. An aqueous modified urea formaldehyde resin (UF resin) binder composition comprising from 2.5 to less than 15 wt. % of at least one emulsion polymer as modifier, based on total solids of the UF resin binder compositions, the emulsion polymer having a pH of from 4 to less than 7.0, wherein the emulsion polymer comprises, in copolymerized form, (i) one or more alkyl esters of (meth)acrylic acid, or a mixture thereof with one or more vinyl aromatic monomers, and (ii) one or more ethylenically unsaturated carboxylic acid group containing monomers, in the amount of from 5 to 25 wt. %, and, further wherein, the emulsion polymer has a measured glass transition temperature as measured by differential scanning calorimetry (DSC) ranging from −40° C. to 70° C.

2. The aqueous modified UF resin binder composition as claimed in claim 1, wherein the emulsion polymer comprises, in copolymerized form, (i) one or more alkyl esters of (meth)acrylic acid are chosen from a) a mixture of butyl acrylate, ethyl acrylate, methyl acrylate, ethylhexyl methacrylate with at least one $C_1$ to $C_{18}$ alkyl ester of (meth)acrylic acid other than butyl acrylate, ethyl acrylate, methyl acrylate, or ethylhexyl methacrylate; or c) the mixture a) with one or more vinyl aromatic monomers.

3. The aqueous modified UF resin binder composition as claimed in claim 1, wherein the emulsion polymer comprises, in copolymerized form, (i) one or more alkyl esters of (meth)acrylic acid are chosen from b) mixtures of any of butyl acrylate, ethyl acrylate, methyl acrylate, or ethylhexyl methacrylate with methyl methacrylate; or c) the mixture b) with one or more vinyl aromatic monomers.

4. The aqueous modified UF resin binder composition as claimed in claim 1, wherein the emulsion polymer comprises, in copolymerized form, (ii) one or more ethylenically unsaturated carboxylic acid group containing monomers chosen from acrylic acid or methacrylic acid.

5. The aqueous modified UF resin binder composition as claimed in claim 1, wherein the emulsion polymer comprises, in copolymerized form, the (ii) one or more ethylenically unsaturated carboxylic acid group containing monomers in the amount of from 10 to 20 wt. %, based on the total weight of all monomers used to form the emulsion copolymer.

6. The aqueous modified UF resin binder composition as claimed in claim 1, wherein the emulsion polymer has a measured glass transition temperature (DSC) ranging from −30° C. to 60° C.

7. The aqueous modified UF resin binder composition as claimed in claim 1, wherein the emulsion polymer has a weight average particle size of from 100 to 500 nm.

8. The aqueous modified UF resin binder composition as claimed in claim 7, wherein the emulsion polymer has a weight average particle size of from 170 to 400 nm.

9. The aqueous modified UF resin binder composition as claimed in claim 1, wherein the emulsion polymer comprises less than 30% of its carboxylic acid groups in a neutralized form.

* * * * *